United States Patent [19]

Audeh et al.

[11] 4,368,126

[45] Jan. 11, 1983

[54] METHOD OF REMOVING MOISTURE FROM HYDRAULIC SYSTEMS

[75] Inventors: Constandi A. Audeh, Princeton, N.J.; Joseph J. Dickert, Jr., Yardley, Pa.

[73] Assignee: Mobil Oil Corporation, New York, N.Y.

[21] Appl. No.: 216,120

[22] Filed: Dec. 15, 1980

Related U.S. Application Data

[63] Continuation-in-part of Ser. No. 32,078, Apr. 23, 1979, abandoned.

[51] Int. Cl.³ ............................................... B01D 15/00
[52] U.S. Cl. ..................................... 210/663; 210/689
[58] Field of Search ............... 210/287, 295, 663, 669, 210/689; 252/455 Z; 303/1; 55/35, 75

[56] References Cited

U.S. PATENT DOCUMENTS

| | | | |
|---|---|---|---|
| 2,195,989 | 4/1940 | Hoffman | 210/689 |
| 2,661,847 | 12/1953 | Buettner | 303/1 |
| 3,080,433 | 3/1963 | Hengstebeck | 210/689 |
| 3,224,845 | 12/1965 | Thomas | 210/689 |

OTHER PUBLICATIONS

"Isotherm Data Sheet No. 13X-1", Union Carbide Publication (Nov. 1957).

*Primary Examiner*—Ivars C. Cintins
*Attorney, Agent, or Firm*—Charles A. Huggett; Michael G. Gilman; Howard M. Flournoy

[57] ABSTRACT

A novel means of inhibiting the corrosion of hydraulic systems is provided wherein hydraulic fluid containing moisture is contacted with a dessicant such as zeolite 13X thereby substantially removing said moisture.

7 Claims, No Drawings

METHOD OF REMOVING MOISTURE FROM HYDRAULIC SYSTEMS

CROSS REFERENCE TO RELATED APPLICATIONS

This application is a continuation-in-part of application Ser. No. 032,078, filed Apr. 23, 1979 and entitled "METHOD OF REMOVING MOISTURE FROM HYDRAULIC SYSTEMS", now abandoned.

BACKGROUND OF THE INVENTION

1. Field of the Invention

This invention is directed to a method of removing moisture from hydraulic systems, e.g., automotive brake and clutch assemblies. This invention is further directed to means of providing substantially corrosion-free hydraulic systems.

2. Discussion of the Prior Art

Significant problems exist in the maintenance of hydraulic systems in automotive and allied applications or in other systems in which force is transferred through a fluid, i.e., any system which has a master cylinder to which force is applied and a slave cylinder or cylinders which do work.

In automotive type brake systems particularly, a problem arises from cylinder corrosion. This usually results from the fact that many hydraulic fluids are hydroscopic. Water is absorbed and dissolves in the hydraulic fluid from moist air, etc., during inspection. This contributes to cylinder wall corrosion and consequent wear of pistons, sleeves, cups, etc.

A means of absorbing the water from the hydraulic fluid could significantly reduce this problem thus reducing the need for overhauling hydraulic systems as a result of corrosion, e.g., the need for overhauling automotive braking systems.

Applicants are not aware of any existing system which anticipates or fairly suggests their invention which provides a means for reducing moisture and/or water induced corrosion and the frequent need for overhauling hydraulic systems.

SUMMARY OF THE INVENTION

In accordance with this invention a method is provided for reducing and/or substantially eliminating moisture and/or water from hydraulic systems. Generally speaking, this is accomplished by placing a container having a suitable dessicant in the hydraulic system and causing the hydraulic fluid therein to contact said dessicant. Water is thereby absorbed from the hydraulic fluid.

DESCRIPTION OF SPECIFIC EMBODIMENTS

A container with a dessicant, such as Mobil Sorbead, permeable to hydraulic fluid but not to particulate matter is placed in the hydraulic fluid reservoir. A container or cartridge containing the dessicant is also placed in the hydraulic fluid at suitable places in the lines between the master cylinder and the slave cylinders to further increase the absorption of water from the fluid.

The dessicant used can be of any suitable type so long as it is permeable to the hydraulic fluid itself but not to particulate matter. Some suitable dessicants include Mobil Sorbeads, Type A Zeolite, Type X Zeolite or Type Y Zeolite. Mobil Sorbead is a registered Trademark which is used to identify silica gel dessicants, etc., made in a unique bead form. This dessicant is usually used in the natural gas and liquified petroleum gas industries, air conditioning and refrigeration systems as well as in air drying. Dessicants of this type have a high capacity for water, long life and resistance to attrition and dusting and also provide a low dew point throughout their service life.

Any suitable container fairly suggested by this disclosure can be used so long as there is a means of ingress and egress to the chamber containing the dessicant. Preferred are containers made of non-corrosive materials, e.g., teflon.

The method of this invention is adaptable to any hydraulic system susceptible to corrosion induced by the absorption or dissolving of water in the hydraulic fluid.

The following exemplary data illustrate the specific practice of this invention but are intended in no way to limit its scope.

EXAMPLE

A brake fluid having the characteristics specified in SAE Standard SAE J1703f was selected as the test hydraulic fluid:

TEST PROCEDURE

The hydraulic (brake) fluid is caused to flow through guard chambers containing dessicant at a preselected flow rate and temperature. Temperature and flow rate are not critical factors. The process in accordance with this invention is operable under the same conditions under which the hydraulic systems normally function. The fluid moisture content before and after contact with the sorbent is then measured.

The sorbent used in the test procedure was Mobil Sorbeads or zeolite 13X. The composition and characteristic thereof are well known in the art.

TABLE

| Moisture Content of Contaminated Brake Fluid | Moisture Content of Fluid After Contact with Dessicant |
|---|---|
| % Wt. | PPM |
| Example 1: 5.00 | 3 |
| Example 2: 0.25 | 1 |
| Example 3: 0.125 | 1 |
| Temperature 135° F. | |
| LHSV 2 | |

10 volumes of hydraulic fluid were used in Example 1 and 7 volumes in Examples 2 and 3.

It is apparent from the data in the Table that the moisture content of the hydraulic fluid so tested was significantly reduced. Therefore, the propensity of hydraulic systems subjected to the process as embodied herein to have corrosion problems is similarly reduced.

Departure from the specific embodiments exemplified herein can be made within the scope of this invention as is well known to those of ordinary skill in the art.

We claim:

1. A method for effecting the removal of moisture and water from a closed hydraulic system wherein said system contains a master and a slave cylinder and is normally susceptible to corrosion in the presence of water comprising contacting the hydraulic fluid therein with a dessicant placed in the reservoir and at locations in the lines between said master and slave cylinders so as to provide contact between hydraulic fluid and dessicant whereby substantially all of said water contained therein is removed.

2. The method of claim 1 wherein the hydraulic fluid is one adapted for use in a braking or clutch system.

3. The method of claim 2 wherein the hydraulic fluid is adapted for use in a braking system.

4. A method for substantially preventing corrosion in a closed hydraulic system by removal of water from the hydraulic fluid of said system comprising passing said fluid through chambers containing a dessicant, selected from the group consisting of silica gel, Type A Zeolite, Type X Zeolite and Type Y Zeolite and thereafter passing said fluid through filters to entrap dessicant particles, said chambers and filters being located at various positions in said hydraulic system.

5. The method of claim 4 wherein the dessicant is silica gel.

6. The method of claim 4 wherein the dessicant is Type X Zeolite.

7. The method of claim 6 wherein the dessicant is zeolite 13X.

* * * * *